United States Patent
Buiel et al.

(10) Patent No.: US 7,881,042 B2
(45) Date of Patent: Feb. 1, 2011

(54) CELL ASSEMBLY FOR AN ENERGY STORAGE DEVICE WITH ACTIVATED CARBON ELECTRODES

(75) Inventors: Edward R. Buiel, Mount Pleasant, SC (US); Victor Eshkenazi, Vaughan (CA); Leonid Rabinovich, Thornhill (CA); Wei Sun, Thornhill (CA); Vladimir Vichnyakov, Newmarket (CA); Adam J. Swiecki, Milton (CA); Joseph E. Cole, New Castle, PA (US)

(73) Assignee: Axion Power International, Inc., New Castle, PA (US)

( * ) Notice: Subject to any disclaimer, the term of this patent is extended or adjusted under 35 U.S.C. 154(b) by 136 days.

(21) Appl. No.: 11/553,410

(22) Filed: Oct. 26, 2006

(65) Prior Publication Data

US 2008/0100990 A1    May 1, 2008

(51) Int. Cl.
*H01G 9/00* (2006.01)
*H01M 6/04* (2006.01)
*H01M 4/56* (2006.01)

(52) U.S. Cl. .................. 361/502; 429/204; 429/225

(58) Field of Classification Search ............... 361/502, 361/503; 429/9, 204, 225
See application file for complete search history.

(56) References Cited

U.S. PATENT DOCUMENTS

| 1,594,810 | A | | 8/1926 | Benner et al. |
|---|---|---|---|---|
| 3,306,779 | A | | 2/1967 | Flannery et al. |
| 3,352,718 | A | | 11/1967 | Carson, Jr. et al. |
| 3,404,061 | A | * | 10/1968 | Bochman et al. ............ 428/143 |
| 3,434,883 | A | | 3/1969 | Cretella et al. |
| 3,457,112 | A | | 7/1969 | Reber |
| 3,652,902 | A | * | 3/1972 | Hart et al. ............ 361/502 |
| 3,856,574 | A | | 12/1974 | Amagi et al. |
| 3,926,764 | A | * | 12/1975 | Ruzicka et al. ............. 204/418 |
| 4,014,730 | A | | 3/1977 | Selover, Jr. et al. |
| 4,265,952 | A | * | 5/1981 | Caines ............... 138/140 |
| 4,438,481 | A | | 3/1984 | Phillips et al. |
| 4,725,927 | A | | 2/1988 | Morimoto et al. |
| 4,862,328 | A | * | 8/1989 | Morimoto et al. ........... 361/502 |
| 5,006,426 | A | | 4/1991 | Suzuki et al. |

(Continued)

FOREIGN PATENT DOCUMENTS

JP        06342660 A        12/1994

(Continued)

OTHER PUBLICATIONS

English Abstract of JP2003068307.

(Continued)

*Primary Examiner*—Eric Thomas
*Assistant Examiner*—David M Sinclair
(74) *Attorney, Agent, or Firm*—Cahn & Samuels, LLP (57) ABSTRACT

A hybrid supercapacitor energy storage device includes at least one lead electrode, at least one carbon electrode, a separator, a casing, and an acid electrolyte. The lead electrode is enveloped in a common glass mat separator known in the lead-acid battery industry. The carbon electrode comprises a highly conductive current collector which is a sheet or other metal material sandwiched between two sheets of electronically conductive shield material. Activated carbon is manufactured using a binder such as polyethylene or PTFE adhered to and in electrical contact with the shield material of the current collector.

8 Claims, 5 Drawing Sheets

U.S. PATENT DOCUMENTS

| | | | |
|---|---|---|---|
| 5,162,172 A | 11/1992 | Kaun | |
| 5,476,734 A * | 12/1995 | Pulley et al. | 429/244 |
| 5,494,763 A | 2/1996 | Behl et al. | |
| 5,581,438 A | 12/1996 | Halliop | |
| 5,711,988 A | 1/1998 | Tsai et al. | |
| 5,744,258 A | 4/1998 | Bai et al. | |
| 5,766,789 A | 6/1998 | James et al. | |
| 6,021,039 A | 2/2000 | Inagawa | |
| 6,195,252 B1 | 2/2001 | Belyakov et al. | |
| 6,197,450 B1 | 3/2001 | Nathan et al. | |
| 6,222,723 B1 | 4/2001 | Razoumov et al. | |
| 6,316,148 B1 | 11/2001 | Timmons et al. | |
| 6,335,858 B1 | 1/2002 | Vasechkin et al. | |
| 6,426,862 B1 | 7/2002 | Vasechkin et al. | |
| 6,466,429 B1 | 10/2002 | Volfkovich et al. | |
| 6,628,504 B2 * | 9/2003 | Volfkovich et al. | 361/502 |
| 6,643,119 B2 | 11/2003 | Nanjundiah | |
| 6,706,079 B1 | 3/2004 | Shmatko et al. | |
| 6,917,094 B2 * | 7/2005 | Murakami et al. | 257/532 |
| 6,946,007 B2 | 9/2005 | Bendale et al. | |
| 7,006,346 B2 | 2/2006 | Volfkovich et al. | |
| 7,046,503 B2 * | 5/2006 | Hinoki et al. | 361/502 |
| 7,060,391 B2 | 6/2006 | Gyenge et al. | |
| 7,110,242 B2 | 9/2006 | Adrianov et al. | |
| 7,119,047 B1 | 10/2006 | Adrianov et al. | |
| 7,312,976 B2 * | 12/2007 | Kazaryan et al. | 361/502 |
| 7,443,650 B2 * | 10/2008 | Nedoshivin et al. | 361/502 |
| 2001/0003024 A1 | 6/2001 | Nemoto | |
| 2002/0028389 A1 | 3/2002 | Sonoda et al. | |
| 2003/0086238 A1 | 5/2003 | Bendale | |
| 2003/0110607 A1 | 6/2003 | Bendale et al. | |
| 2004/0090736 A1 * | 5/2004 | Bendale et al. | 361/502 |
| 2005/0002150 A1 * | 1/2005 | Volfkovich et al. | 361/502 |
| 2006/0292384 A1 | 12/2006 | Kazaryan et al. | |
| 2007/0003833 A1 | 1/2007 | Li et al. | |
| 2007/0104981 A1 | 5/2007 | Lam et al. | |
| 2007/0128472 A1 | 6/2007 | Tierney et al. | |
| 2008/0100990 A1 | 5/2008 | Buiel et al. | |
| 2008/0131763 A1 * | 6/2008 | Buiel et al. | 429/149 |
| 2009/0103242 A1 | 4/2009 | Buiel et al. | |
| 2010/0040950 A1 | 2/2010 | Buiel et al. | |
| 2010/0091430 A1 | 4/2010 | Buiel et al. | |

FOREIGN PATENT DOCUMENTS

| | | |
|---|---|---|
| JP | 7235454 A | 9/1995 |
| JP | 11329420 A | 11/1999 |
| JP | 15068307 A | 3/2003 |
| JP | 2003/126863 A | 5/2003 |
| JP | 2004/355823 A | 12/2004 |
| JP | 2004355823 A | 12/2004 |
| KR | 1020050057237 A | 6/2005 |
| KR | 1020060042860 A | 5/2006 |
| WO | 2008/051885 A1 | 5/2008 |
| WO | 2008/051896 A1 | 5/2008 |

OTHER PUBLICATIONS

English Abstract of KR20050057237.
English Abstract of KR1020060042860.
English Abstract of JP 11329420.
English Abstract of JP 06342660.
English Abstract of JP 7235454.
English Abstract of JP 2004355823.
Abstract of JP 2004/355823, Yoshinari, et al., Dec. 2004.
Machine translation of JP 2004/355823, Yoshinari, et al., Dec. 2004.
Abstract of JP 2003/126863, Sato S., May 2003.

* cited by examiner

CELL ASSEMBLY FOR AN ENERGY STORAGE DEVICE WITH ACTIVATED CARBON ELECTRODES

I. FIELD OF THE INVENTION

The present invention relates generally to an electric energy storage device, and more specifically it relates to a cell assembly for a flexible and economical multi-plate hybrid battery supercapacitor having lead-based electrodes and carbon-based electrodes.

II. BACKGROUND OF THE INVENTION

Typically, the most common electrical energy storage devices are electrochemical batteries and capacitors, including supercapacitors. The device disclosed herein is an implementation of a hybrid lead acid battery and activated carbon supercapacitor, having features and performance characteristics that are distinct from either a battery or a supercapacitor.

The energy in this type of hybrid device is stored both electrostatically and electrochemically. The device in keeping with the present invention has a significantly greater cycle life and shorter charge time than a lead-acid battery. The present device also has a much higher energy density than a conventional supercapacitor. Like a conventional supercapacitor, the present device has a linear voltage profile when cycled at constant current. While this type of device typically requires a power conversion interface for many applications, it also delivers an accurate instantaneous mapping of its state of charge. Since the lead electrodes of the energy storage device disclosed herein are very similar to conventional lead-acid battery electrodes, many common components can be used, as well as many common strategies, methods and designs for tuning and enhancing performance.

One problem with the use of conventional lead-acid battery components within devices such as those disclosed herein is that the current collection methods needed for the carbon electrodes are significantly different than those of the lead electrodes. For instance, because of the lesser conductivity of carbon electrodes, the need for maximum surface contact and a short electrical path between the carbon electrode and the underlying collector assembly is paramount. Another problem is corrosion of the current collector. A further problem is the contact resistance between the current collector and the carbon electrode.

In these respects, the disclosed cell assembly for an energy storage device, according to the present invention, substantially departs from the conventional concepts and designs of the prior art, and in so doing provides a flexible and economical way to create a multi-plate, multi-cell, hybrid lead acid battery/supercapacitor energy storage device.

A significant factor in assembly of energy storage devices such as those disclosed herein is that it is desirable that the electrodes be essentially self-contained and free standing, so that they can be easily handled during automated assembly operations. That is achieved in the present invention by assuring that the activated carbon in the negative electrodes is not only in electrical contact with a conductive shield of current collector assembly, but that the activated carbon is also adhered to the conductive shield material. This ensures against settling or shedding of the carbon material, and thereby loss of electrical contact, and, therefore, loss of capacity in the electrode.

Moreover, the necessity for excessive compression of the assembled electrodes in a manufactured, assembled energy storage device of the present invention is obviated. The electrodes need only to be compressed to the same extent as electrodes of an ordinary lead-acid battery. Thus, assembly of energy storage devices in keeping with the present invention may be effected on manufacturing assembly lines that will resemble—and to quite an extent emulate—those of a lead-acid battery manufacturing assembly line. However, the specifics of any such manufacturing assembly line as might be employed to manufacture and assemble energy storage devices in keeping with the present invention are beyond the scope of the present disclosure.

It will be noted that the assignee of the present invention is also the assignee of an invention relating to hybrid energy storage devices which require significant compression of the electrodes when the devices are assembled. The referenced application was originally filed as provisional Specification Serial Number 60/730,397 filed Oct. 27, 2005.

III. SUMMARY OF THE INVENTION

In accordance with one aspect of the present invention, there is provided an energy storage device, comprising at least one lead electrode, at least one carbon electrode assembly, a separator, a casing, and an acid electrolyte.

The carbon electrode assembly consists of carbon electrode and current collector assembly.

The carbon electrode current collector assembly consists of a sheet of highly electrically conductive material sandwiched between two sheets of electrically conductive, chemically resistant shield material. A conductive attachment feature for the current collector is used for electrical interconnection to other components. An area of the conductive shield is used to seal two shields together.

The shield material according to the invention has to be an electronic conductor and ionic insulator. The said shield material has to be chemically resistant and electrochemically stable in the electrolyte during operation of the hybrid device.

The carbon electrode is made so that it can engage the current collector assembly, and is adhered to and in electrical contact with the current collector assembly, so as to form a carbon electrode assembly.

An alternate embodiment of the carbon electrode assembly is comprised of a current collector assembly sandwiched between two sheets of activated carbon, and may be used as a component in multi-plate hybrid cells.

A hybrid cell assembly is comprised of at least one carbon-electrode assembly, at least one lead electrode and of an aqueous sulfuric acid electrolyte.

More preferentially, a hybrid cell assembly is comprised of two or more carbon electrode assemblies, and one or more lead electrodes.

The at least one lead electrode comprises an active lead-based mass applied to a lead-based current collector. The lead electrode is enveloped in a common glass mat separator. Both lead electrode and separator are known in the lead-acid battery industry.

Each of the carbon electrode assemblies comprises a sheet of highly conductive material sealed between two sheets of electronically conductive shield material which is chemically resistant and electrochemically stable in said acid electrolyte during operation of the hybrid device, and one or two carbon electrodes adhered to and in electrical contact with one or both sides of the shield material.

The activated carbon is adhered to and in electrical contact with the said conductive shield material by a binder material chosen from the group consisting of PTFE, polyethylene, and other polymers.

The activated carbon is adhered to the shield material of the current collector assembly by a method chosen from the group consisting of thermal lamination technique, conductive adhesives, interposing a carbon black layer, and combinations thereof.

The current collector is comprised of a sheet of metal chosen from the group consisting of conductive material having better conductivity than lead and may be copper, iron, titanium, silver, gold, aluminium, platinum, palladium, tin, zinc, cobalt, nickel, magnesium, molybdenum, and mixtures, combinations, and alloys thereof including stainless steel.

The shield material may comprise a sheet of expanded graphite foil impregnated with a material chosen from the group consisting of paraffin, other waxes, thermoplastic materials, furfural, PTFE, polyethylene, and mixtures and combinations thereof.

The sheets of electronically conductive shield material are sealed around the periphery of the current collector and the carbon electrode is adhered to and in electrical contact therewith.

Each of the carbon electrode assembly and lead electrodes has a tab affixed thereto so as to be electrically connected to a respective positive or negative external lug when the energy storage device is assembled.

The seal around the periphery of the current collector, is effected by a method chosen from the group consisting of applying heat to the seal area, applying pressure to the seal area, applying heat and pressure to the seal area, applying adhesive glue to the seal area, applying a sealing gasket material comprised of thermoplastic film to the seal area, and combinations thereof.

The carbon electrode contains inert binder material added to activated carbon particles, and the inert binder material is chosen from the group consisting of polyethylene powder, thermoplastic powder, thermoplastic granules, PTFE.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a cell assembly for an energy storage device that will overcome several shortcomings of the prior art energy storage devices.

An object of the present invention is to provide a cell assembly for an energy storage device to provide an apparatus which provides a flexible and economical method of creating a multi-plate hybrid battery/supercapacitor energy storage device.

Another object is to provide a cell assembly for an energy storage device that provides a chemically compatible highly conductive interface for the porous carbon electrode, whereby the carbon electrode is adhered to and in electrical contact with a current collector assembly.

Another object is to provide a cell assembly for an energy storage device that is easily assembled into multi-plate cells.

Another object is to provide a cell assembly for an energy storage device that is manufacturable by conventional processes and with economical materials.

IV. BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

V. DETAILED DESCRIPTION OF THE INVENTION

The novel features which are believed to be characteristic of the present invention, as to its structure, organization, use and method of operation, together with further objectives and advantages thereof, will be better understood from the following discussion.

Turning now to the drawings, in which similar reference characters denote similar elements throughout the several views, the attached figures illustrate various embodiments of cell assemblies for a supercapacitor energy storage device in keeping with the present invention.

Figure 1:
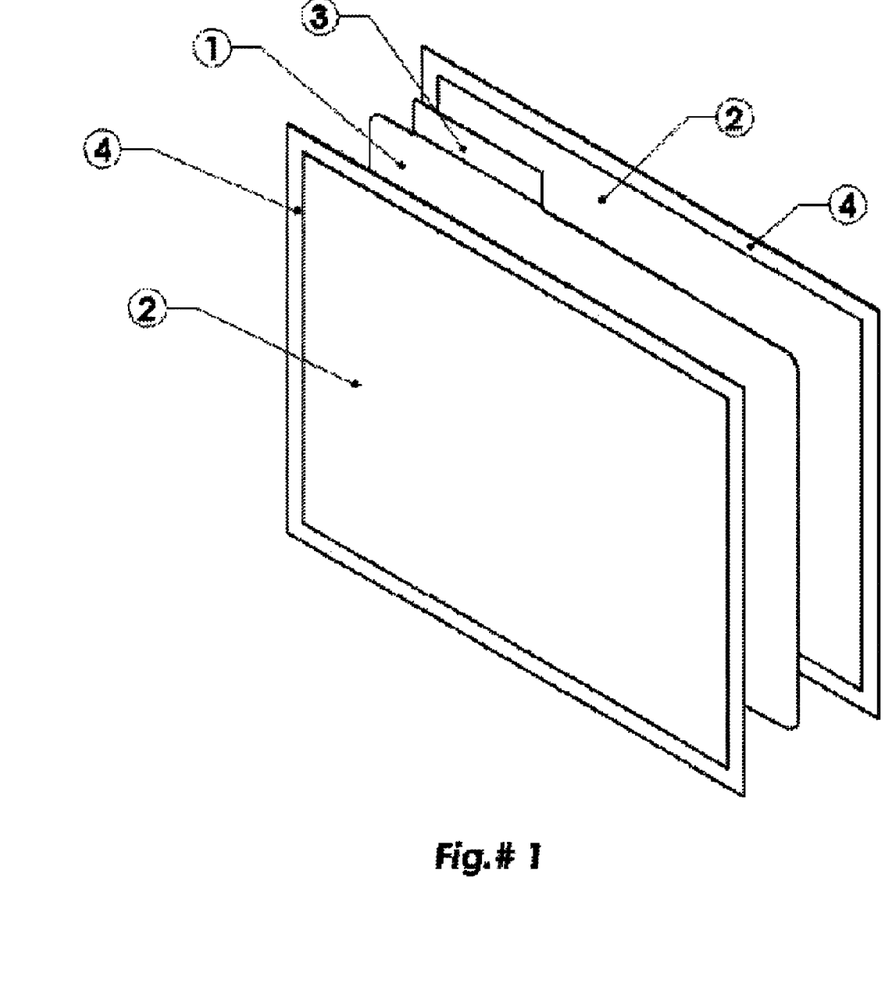
FIG. 1 is an exploded view showing current collector subassembly elements.

Referring now to FIG. 1, a current collector (1) is made from a thin sheet of material, commonly by a die cut process. The material is most commonly a highly conductive metal. In this embodiment, the collector shown is a thin, flat sheet of copper, but other highly conductive metals may include copper alloys, titanium, aluminum, silver, stainless steel, nickel, and mixtures and combinations thereof. The metal sheet may be manufactured in various shapes and thicknesses.

Referring still to FIG. 1, a conductive shield (2) is made of material, which is chemically resistant and electrochemically stable in the electrolyte during operation of the hybrid device, said material being selected so as to prevent ionic and allow electronic conductivity. In keeping with the present invention, the conductive shield may be comprised of a sheet or layer of graphite foil, impregnated with paraffin via vacuum oven processing, and drawn into the interior of interior of the foil. The resulting conductive shield resists electrolyte penetration or interaction, but allows the conduction of electrical current therethrough.

Referring still to FIG. 1, the tab (3) permits attachment to the current collector (1), and is used for electrical interconnection to other components. In the preferred embodiment, this is a lead tab, soldered to the copper conductor. Other embodiments include other common solders, crimped leads, and the use of non-lead components. The details of a tab feature are not critical to the overall operating characteristics of energy storage devices in keeping with the present invention.

An area of the conductive shield is used to seal two shields together, encapsulating the current collector. Referring still to FIG. 1, the seal area of the conductive shield (4) is one or more areas where one conductive shield (2) is placed in contact with another conductive shield so as to encapsulate the current collector (1). The depicted embodiment shows a seal area which encircles the interior of the conductive shield, and which extends beyond the peripheral dimensions of the encapsulated current collector.

The seal can be established under heat and pressure treatment, or with adhesive glues, or with sealing gasket material comprised of thermoplastic film in the seal area. In the embodiment shown, the seal is effected by an adhesive material placed between the two shields and limited to the seal area of the shields Referring still to FIG. 1, an entire current collector assembly is constructed by enclosing the current collector (1) within two layers of conductive shield (2), and sealing the current collector via the seal area (4), so that only a tab (3) which is attached to the current collector extends beyond the joined shields.

Figure 2:
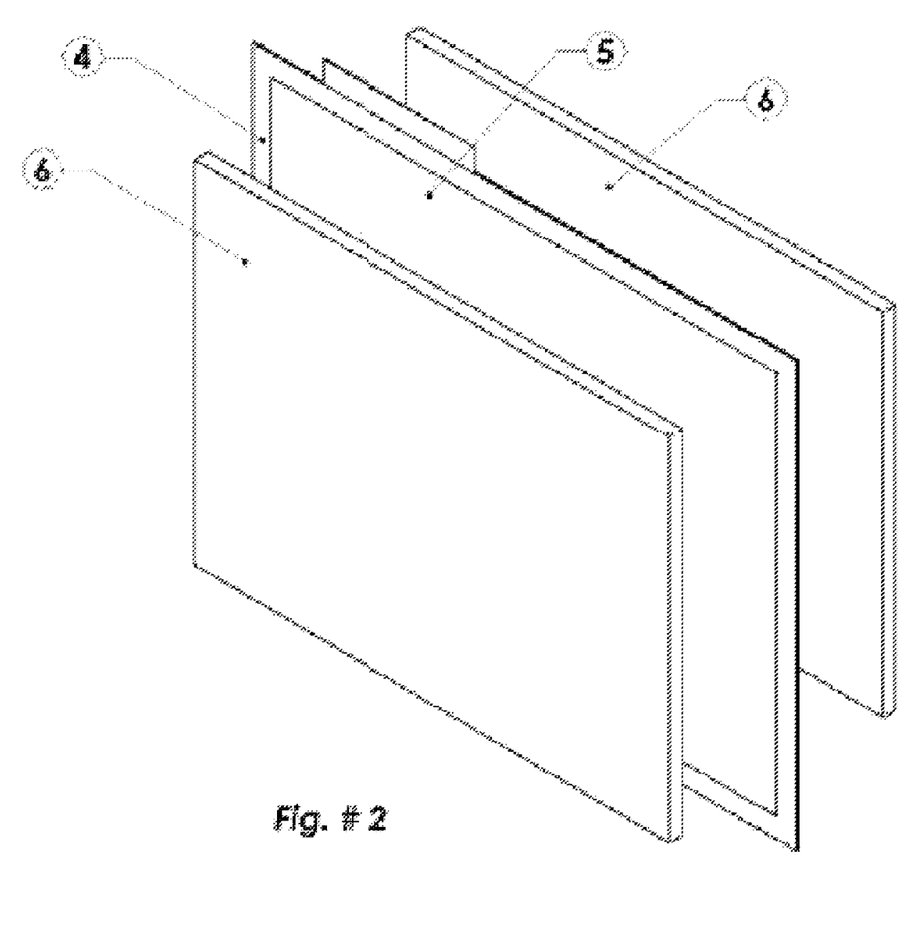
FIG. 2 is an exploded view showing carbon electrode subassembly elements.

Referring now to FIG. 2, (5) depicts the current collector assembly described above. A carbon electrode is adhered to and in electrical contact with the conductive shield (2) of the current collector assembly (5). Referring still to FIG. 2, and also to FIG. 1, carbon material (6) is shaped into a sheet or layer which is sized to conform to the dimensions of the current collector (1) within the conductive shields (2). The thickness of the carbon electrode is determined by the electrochemical requirements of the cell. Thicker carbon materials store more energy, but make a bulkier cell. Thinner materials allow more plates within the same casing size, increasing the power density.

In any event, the activated carbon is adhered to and is in electrical contact with the conductive shield (2) of the current collector assembly (5) by the use of a binder material which is PTFE, polyethylene or other materials. Use of such binder materials ensures intraparticle contact as well as adherence of the carbon electrode (6) to the current collector assembly (5).

The method employed to adhere the highly porous carbon to the conductive shield (2) of current collector assembly (5) may include thermal lamination techniques, the use of conductive adhesives, interposing a carbon black layer, and combinations thereof.

The carbon material in this embodiment is formed as a composite from activated carbon particles with inert binder material added to aid mechanical stability and handling.

Other additives may also be present in order to aid conductivity or to enhance mechanical properties. The exact nature and processing of the carbon material greatly affects the performance of the device, and is the subject of a separate disclosure. Thus, the exact nature of the carbon material is outside the scope of the present disclosure.

In this embodiment, carbon material can be made from fibers or granules, and the binder material is PTFE. However, as noted the binders may also comprise polyethylene, or other thermoplastic powders or granules selected so as to adhere the carbon into a shaped mass without interacting chemically or electrochemically in processes of the cell.

Figure 3:
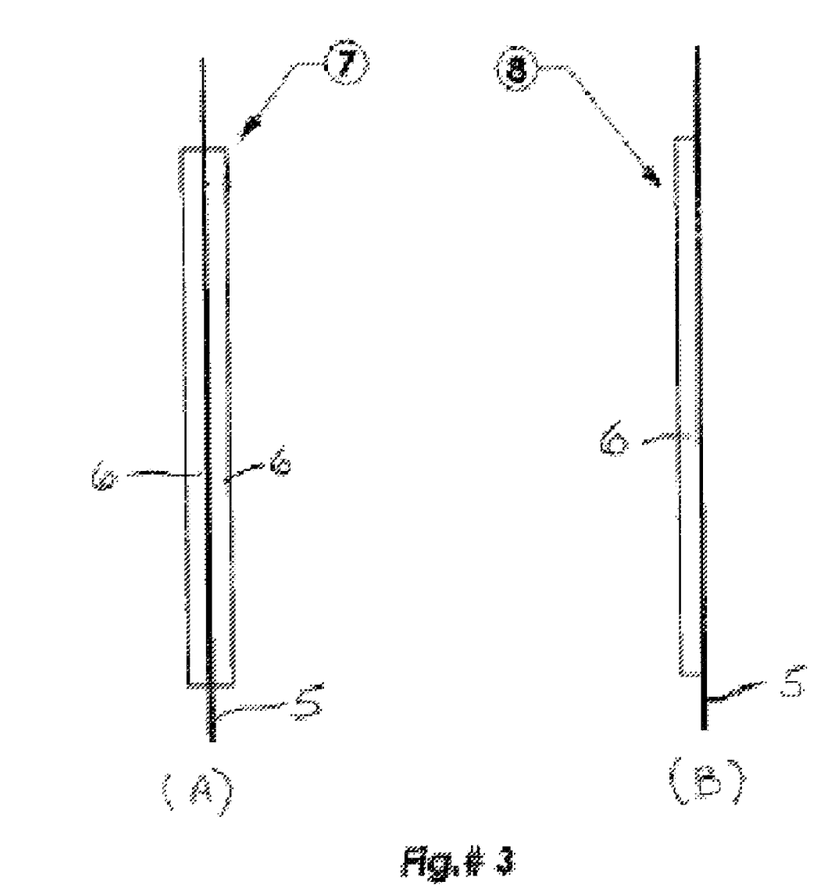
FIG. 3 is a side view of two different embodiments of the carbon electrode subassembly.

Referring now to FIG. 2 and FIG. 3, there is depicted (7) a carbon electrode subassembly, which is referred to hereafter as a type A subassembly. It comprises two sheets of carbon electrodes (6) adhered to and in electrical contact with a current collector assembly (5) in the manner described above.

An alternate assembly used in the interior of multi-plate cells is shown in FIG. 3 at (8). This is referred to hereafter as a carbon electrode type B subassembly; and comprises of a sheet of carbon electrode (6) adhered to and in electrical contact with only one side of a current collector assembly (5). There are two obvious embodiments of this subassembly (8) that are used within the cell construction otherwise in keeping with the present invention, depending upon which side of the current collector assembly (5) to which the porous carbon electrode (6) is adhered.

Figure 4:
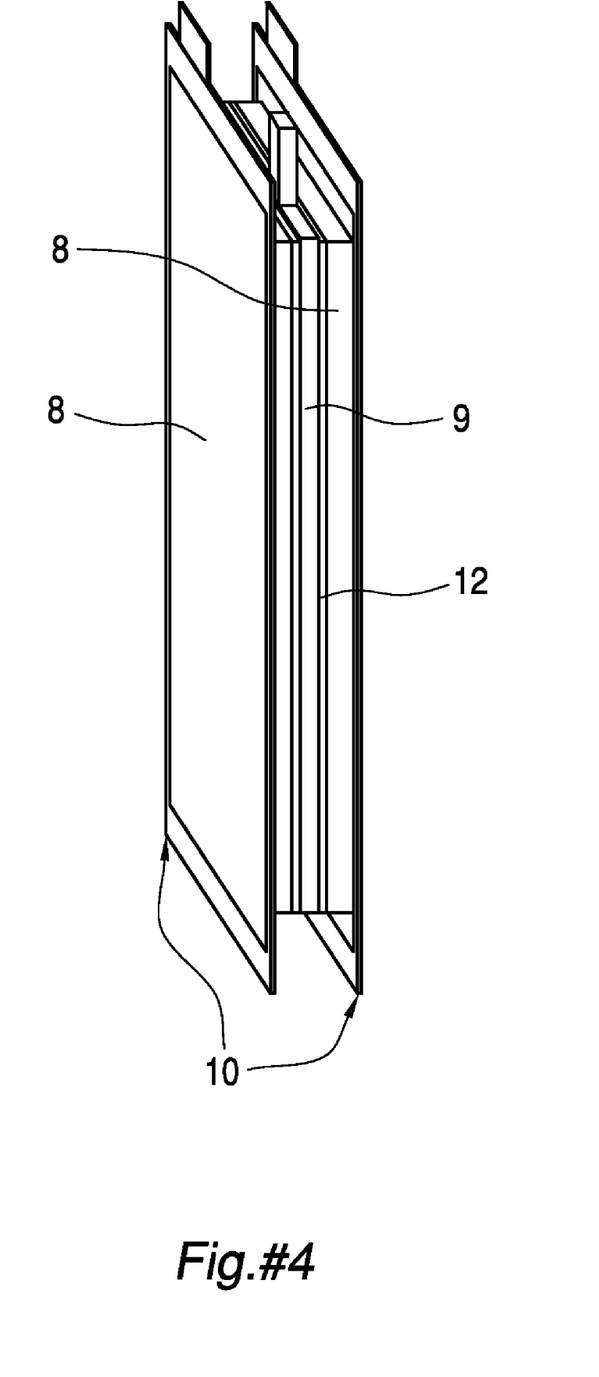
FIG. 4 is a side view of a single lead plate form of the hybrid cell.

A Cell unit (10) comprised of two carbon electrode type A subassemblies, and a lead electrode (9) in a porous separator envelope (12) is depicted in FIG. 4. Here, a basic single plate hybrid cell subassembly (10) is shown comprised of two carbon electrode type B subassemblies (8) placed on either side of a lead electrode. This subassembly, if soaked in a needed amount of electrolyte, comprises the most basic variant of the hybrid cell. In this embodiment, the electrolyte is comprised primarily of an aqueous sulfuric acid solution of a type which is commonly known to those skilled in the art of lead-acid battery industry.

Figure 5:
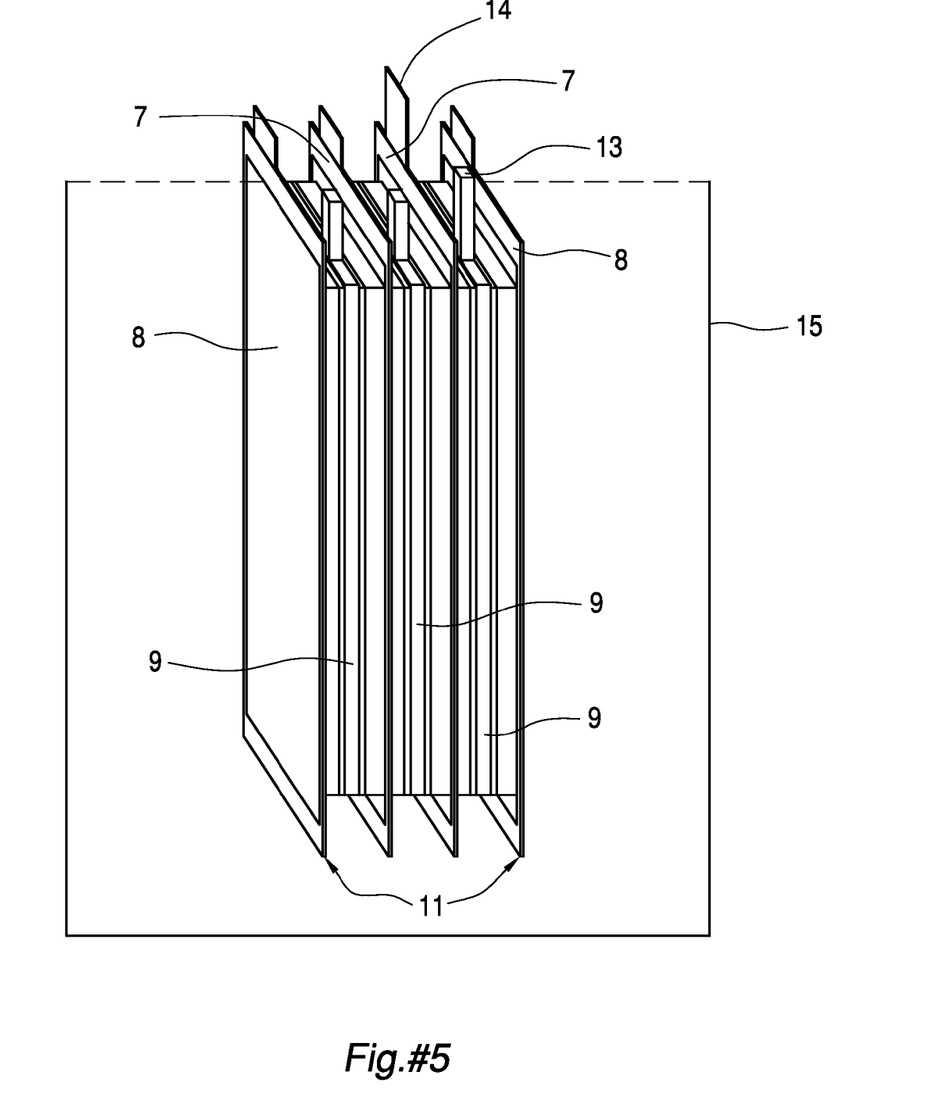
FIG. 5 is a side view of a multiple lead plate form of the hybrid cell.

An alternate cell unit (11) comprised of two carbon type A electrode subassemblies (7), three lead electrodes (9), and two carbon type B electrode subassemblies (8), is shown in FIG. 5. An arrangement of two type B carbon subassemblies, n type A carbon subassemblies, and n+1 lead electrodes comprises a more useful variant of the hybrid cell.

Assembly of the carbon-based electrodes, the lead electrodes, electrolyte, lugs 13 connected to the lead electrodes and lugs 14 connected to the negative electrodes for external connection of the supercapacitor, and a casing 15, is in keeping with adapted lead-acid battery assembly and manufacturing techniques. However, specific details of such construction are beyond the scope of the present invention.

It will be clear to those skilled in the art of assembly of lead-acid batteries that variations of design and assembly of supercapacitor energy storage devices in keeping with the present invention include multiple cell housings, having serial or parallel cell interconnection.

As a further discussion of the manner of usage and operation of the present invention, the electrochemical operation of the device is generally known to one skilled in the design of hybrid lead acid battery and porous carbon supercapacitor devices, and should be apparent from the above description. Accordingly, no further discussion relating to the manner of usage and operation is made herein.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

We claim:
1. A hybrid lead-carbon-acid supercapacitor energy storage device, comprising:
 at least one lead electrode, at least one carbon electrode assembly, a separator, a casing, and an acid electrolyte comprising an aqueous solution of sulfuric acid;
 wherein said at least one carbon electrode assembly comprises:

a current collector comprising a sheet of copper sealed between two sheets of electronically conductive shield material comprising expanded graphite foil impregnated with paraffin and at least one electrode comprising activated carbon and polytetrafluoroethylene adhered to and in electrical contact with a surface of said shield material.

2. The hybrid supercapacitor energy storage device of claim 1, wherein said two sheets of electronically conductive shield material are sealed around the periphery of said sheet of copper, thereby encapsulating the sheet of copper.

3. The hybrid supercapacitor energy storage device of claim 1, wherein each of said electrodes has a lead tab affixed thereto so as to be electrically connected to a respective positive or negative external lug when said energy storage device is assembled.

4. The energy storage device of claim 1, wherein the at least one carbon electrode assembly comprises two electrodes of activated carbon and polytetrafluoroethylene, each electrode adhered to an opposing side of said shield material.

5. The energy storage device of claim 1, wherein the graphite foil is impregnated via vacuum oven processing so that the paraffin is drawn into the interior of the graphite foil.

6. A hybrid lead-carbon-acid supercapacitor energy storage device, comprising:

at least one lead electrode;

at least one carbon electrode assembly;

a separator; and an acid electrolyte;

wherein said at least one carbon electrode assembly comprises:

a copper current collector;

two sheets of graphite foil impregnated with paraffin, wherein said two sheets of graphite foil encapsulate the current collector and extend beyond the peripheral dimensions of the current collector so that only a tab extends beyond the two sheets of graphite foil, and at least one electrode comprising activated carbon and polytetrafluoroethylene adhered to and in electrical contact with at least one of said sheets of graphite foil.

7. The energy storage device of claim 6, comprising two electrodes of activated carbon and polytetrafluoroethylene, each electrode adhered to an opposite and external side of a sheet of impregnated graphite foil.

8. The energy storage device of claim 6, wherein said at least one carbon electrode assembly further comprises carbon black.

* * * * *